United States Patent
McHaney et al.

[11] Patent Number: 5,948,447
[45] Date of Patent: Sep. 7, 1999

[54] APPARATUS FOR PRODUCT RECOVERY OF POLYOLEFINGS

[75] Inventors: Stephen C. McHaney, Odessa; Steven L. Oetting, Midland; Karl L. Herzog, Odessa, all of Tex.

[73] Assignee: Huntsman Polymers Corporation, Salt Lake City, Utah

[21] Appl. No.: 08/630,800

[22] Filed: Apr. 10, 1996

Related U.S. Application Data

[63] Continuation-in-part of application No. 08/357,159, Dec. 15, 1994, abandoned, which is a continuation of application No. 08/102,289, Aug. 5, 1993, abandoned.

[51] Int. Cl.⁶ ...................................................... B29B 7/30
[52] U.S. Cl. ................. 425/171; 425/377; 425/378.1; 425/815; 73/198; 73/861; 528/502 R; 528/502 C; 528/503
[58] Field of Search .................... 425/171, 377, 425/378.1, 815; 73/198, 861; 528/483, 502 R, 502 C, 503

[56] References Cited

U.S. PATENT DOCUMENTS

| | | | |
|---|---|---|---|
| 3,219,622 | 11/1965 | Luciani et al. | 260/45.95 |
| 3,690,180 | 9/1972 | Van Der Veer | 73/432 R |
| 3,773,743 | 11/1973 | Ainswoth, Jr. et al. | 260/94.9 |
| 4,094,942 | 6/1978 | Nakai et al. | 528/499 |
| 4,098,990 | 7/1978 | Lutze et al. | 528/499 |
| 4,099,335 | 7/1978 | Jezl et al. | 34/9 |
| 4,137,387 | 1/1979 | Miserlis et al. | 528/499 |
| 4,340,701 | 7/1982 | Willmore et al. | 528/502 |
| 4,504,615 | 3/1985 | Mills | 526/352 |
| 4,701,489 | 10/1987 | Hughes et al. | 524/349 |
| 4,958,006 | 9/1990 | Bernier et al. | 528/501 |
| 5,206,292 | 4/1993 | Hwo et al. | 528/499 |
| 5,672,679 | 9/1997 | Takagi et al. | 528/502 C |

FOREIGN PATENT DOCUMENTS

| | | |
|---|---|---|
| A-0123882 | 10/1984 | European Pat. Off. . |
| 348907 | 1/1990 | European Pat. Off. . |
| A-0348907 | 1/1990 | European Pat. Off. . |
| A-2387753 | 11/1978 | France . |
| 879142 | 10/1961 | United Kingdom .................. 528/502 |

OTHER PUBLICATIONS

Brayton O. Paul, Ed., "Sixteen Level–Sensing Methods: Choosing Among the Various Ways to Gauge Vessel Levels," Aug. 1994, *Chemical Processing*, pp. 75–82.

*Primary Examiner*—Fred Teskin
*Attorney, Agent, or Firm*—Pennie & Edmonds LLP

[57] ABSTRACT

A method and apparatus for product recovery of polyolefins, particularly high molecular weight amorphous poly alphaolefins, wherein the use of water during the method is significantly decreased and wherein the intermediate stage of storing and drying the chunk form of the polyolefin is eliminated. Polyolefins produced in a reactor are heated and mixed by sigma blades in a kneader-extruder to remove any unreacted monomer(s). The polyolefin material in a liquid form is then transferred directly to an extruder to further remove any unreacted monomer(s) and catalyst(s). The invention further includes a method of measuring the inventory in a vessel using a gas of known quantity and known thermodynamic properties.

18 Claims, 5 Drawing Sheets

5,948,447

APPARATUS FOR PRODUCT RECOVERY OF POLYOLEFINGS

CROSS REFERENCE TO RELATED APPLICATIONS

This application is a continuation-in-part of application Ser. No. 08/357,159, filed Dec. 15, 1994, now abandoned, which is a continuation of application Ser. No. 08/102,289 filed Aug. 5, 1993, now abandoned.

FIELD OF THE INVENTION

The present invention relates to a method and apparatus for product recovery of polyolefins, and more specifically to a method and apparatus for recovering high molecular weight amorphous poly alphaolefins.

BACKGROUND OF THE INVENTION

Amorphous poly alphaolefins such as amorphous propylene homo and copolymers, are important for their use in diverse products. The broad utility of these materials is due in large part to the unique combination of chemical and physical properties such as chemical inertness, softness, flexibility, etc., exhibited by these materials.

Conventionally, amorphous polyolefins are mixed with water to deactivate the catalysts and remove unreacted monomer(s). Removing the catalysts and monomer(s) renders wet, tenaciously sticky, granular chunks of the product. For the material to be shaped into various products, the chunks must be dried and then extruded or otherwise shaped.

Extrusion of the material typically involves feeding the dried chunks of the desired polymer from a hopper to the feed section of a screw-type extruder. The polyolefin material is moved through the extruder by screw flights where it is heated and mechanically worked before it is pelletized or otherwise shaped under high pressure. Alternatively, such materials are also shaped by other high temperature methods such as injection molding, roll milling and compression molding. Both lower and higher molecular weight amorphous poly alphaolefins are typically processed as outlined above.

However, existing methods of product transport and recovery require the introduction of water to carry the material through the several stages of recovery from the polymer reactor to the extruder. The extensive use of water by these methods requires that additional storage tanks, delivery and removal lines, and other miscellaneous equipment be used to introduce, maintain, remove and recycle the necessary volume of water. Additionally, existing methods store the material in a chunk form prior to extrusion into useable products, thus requiring additional storage and transport equipment along with the associated maintenance equipment for this intermediate stage of processing. Thus, a need has arisen for a product recovery method and apparatus for recovery of polyolefins, particularly high molecular weight amorphous poly alphaolefins, wherein the use of water during the product recovery is significantly decreased and wherein the intermediate stage of storing and drying the chunk form of the polyolefin is eliminated to enhance production efficiency.

Conventional processing equipment, such as sigma mixers, kneaders or kneader/extruders, are generally known. This conventional equipment is typically used for batch mixing of various materials. High molecular weight amorphous poly alphaolefins exhibit increased tackiness and viscosity, as well as relatively higher softening temperatures, when compared with conventional lower molecular weight poly alphaolefins. This combination of properties makes these higher molecular weight polyolefins a unique processing problem. For example, using conventional handling and transport technologies, high molecular weight amorphous poly alphaolefins tend to plug or clog screws, blades, nozzles, fittings, valves, and piping. This is a particularly troublesome problem for autonomous processing of such materials.

There is also a frequent need to measure the amount of material in a vessel, tank, or other processing or storage facility, all of which are hereinafter referred to as "vessels." It is typically desired that the inventory of the vessels not overflow the available volume, and it is typically also desired that the vessels not become completely empty. These problems can be avoided by measurement of the existing inventory of the vessels to permit more control over the input into and output from the vessels of materials. Each type of vessel, along with various equipment of varying volume inside the vessel, presents a unique challenge in measurement of its inventory.

Conventional inventory measuring means include the following possibilities and attendant problems. One method involves mechanically or electronically weighing the vessels before and after inventory is added, which has the dual problems of poor precision when the vessel weighs much more than the inventory, as well as the requirement that the vessel be movable thereby necessitating use of flexible connections.

Another conventional method for vessels with liquid inventory involves use of a pressure measuring device to determine the hydrostatic pressure in the vessel, but this method is of minimal use when the inventory is a solid or sticky material. Another method involves measuring the increased attenuation of a high energy radiation beam, such as gamma radiation, as it passes through additional mass, but this faces the same precision problems as the weighing method. Another conventional method involves measurement of the surface level by means such as floats, mechanical paddle wheels, electrical probes, ultrasonic transceivers, etc. Each has its own problems, especially when the material may not be evenly distributed throughout the vessel.

None of the conventional methods of measuring the inventory of a vessel are sufficiently accurate for measuring the amount of sticky, high molecular weight amorphous poly alphaolefins of the present invention for the reasons presented above. Thus, there is a need to determine the inventory of such materials in continuous processing equipment to overcome the limitations of conventional weighing technology.

SUMMARY OF THE INVENTION

The present invention relates to a method for the recovery of a high molecular weight amorphous polyolefin which overcomes the foregoing and other problems associated with the prior art. This method includes the steps of reacting monomers in a reaction zone to form a high molecular weight amorphous polyolefin material; continuously transferring the polyolefin material along with residual catalyst and unreacted monomer(s) as a mixture from the reaction zone to a conditioning zone of known volume; heating the mixture in the conditioning zone to a temperature of at least about 250° F. while kneading the mixture for a time sufficient to form conditioned polyolefin and to remove unreacted monomer(s); determining the volume of the mixture in the conditioning zone; removing the conditioned polyolefin from the conditioning zone; and controlling at least one of the polyolefin material transfer or conditioned polyolefin removal steps to maintain a sufficient volume of the mixture in the conditioning zone to provide a residence time for the polyolefin which is sufficient to enable removal of a substantial portion of the unreacted monomer(s) while avoiding overheating of the polyolefin.

In this method, the measuring step can include introducing into the conditioning zone a portion of a known volume of a fluid which is non-reactive with the mixture and non-condensable at the conditioning zone temperature to produce a detectable pressure change in the conditioning zone; measuring the volume of the fluid portion and gas that occupies the conditioning zone; and determining the volume of the material mixture in the conditioning zone using the measured and known volumes of the conditioning zone. For example, the measured volume can be subtracted from the known volume of the conditioning zone to determine the volume of the blip material mixture therein.

A preferred fluid portion volume measuring step comprises determining the pressure and temperature of any gas in the conditioning zone before introduction of the fluid portion; determining the pressure and temperature of the known fluid volume before introduction into the conditioning zone; determining the pressure and temperature of the fluid portion which is not introduced into the conditioning zone; measuring the pressure and temperature of the fluid portion and gas that occupy the conditioning zone; and calculating the volume of the fluid portion and gas in the conditioning zone from the measured pressures and temperatures. It is also possible to vent the unreacted monomer(s) from the conditioning zone and to recycle the vented unreacted monomer(s) to the reaction zone.

The invention also may include the steps of controlling the transfer of polyolefin material into the conditioning zone to substantially avoid carryover of polyolefin during the venting step and controlling the polyolefin material transfer, heating, and kneading steps to maintain a substantially constant volume of mixture in the conditioning zone. Alternatively, the polyolefin material may be transferred intermittently to the conditioning zone in the form of blips.

Another aspect of the invention relates to an apparatus for the recovery of a high molecular weight amorphous polyolefin. This apparatus generally would include means for receiving polyolefin material; means for continuously transferring polyolefin material along with residual catalyst and unreacted monomer(s) as a mixture into the receiving means; means for venting unreacted monomer(s) from the receiving means; means for heating the mixture in the receiving means to a temperature of at least about 250° F.; means for kneading the mixture in the receiving means for a time sufficient to form conditioned polyolefin and to remove unreacted monomer(s) from the mixture; and means for removing the conditioned polyolefin from the receiving means for recovery of same; wherein the receiving means is pressurized.

The apparatus may also include means for controlling the material transfer means and the venting means to substantially avoid carryover of polyolefin material into the venting means, means for determining the volume of mixture to assist in maintaining a desired inventory in the receiving means, or means for controlling at least one of the material transfer or conditioned polyolefin removal steps to maintain a sufficient volume of mixture in the receiving means to provide a residence time for the polyolefin which is sufficient to enable removal of a substantial portion of the unreacted monomers while avoiding overheating of the polyolefin.

Particularly preferred components of the apparatus include a means for continuously transferring polyolefin material where a blipper valve is the means to intermittently transfer polyolefin material, at least one vent line and at least one knockout pot associated with the vent line as the means for venting unreacted monomer, and an exit transport screw as the means for removing the conditioned polyolefin. Any conventional means for heating the mixture can be used, such as a jacket encompassing the receiving means and a heating medium which passes between the jacket and the receiving means.

Advantageously, the means for kneading the mixture includes rotatable sigma blades, such as two sigma blades which rotate oppositely to each other to knead the mixture while forcing polyolefin between the blades toward the conditioned polyolefin recovery means. The kneading means may also include blade members which have hollow cores and the heating means may be a heating medium disposed in the hollow cores of the blades. Advantageously, the receiving means is operated at a pressure of from about 35 to 100 psig.

Another aspect of the invention relates to a method for measuring the inventory of a vessel with a known volume. This method includes the steps of introducing a portion of a known volume of a fluid from a reservoir into the vessel, which fluid is non-reactive and non-condensable at the vessel temperature, to produce a detectable pressure change in the reservoir; measuring the volume of the fluid portion and gas that occupies the vessel; and determining the amount of inventory in the vessel by subtracting the measured volume from the known volume of the vessel. The fluid portion volume measuring step may include determining the pressure and temperature of the gas in the vessel before introduction of the fluid portion; determining the pressure and temperature of the known fluid volume before introduction into the conditioning zone; determining the pressure and temperature of the fluid portion which is not introduced into the vessel; measuring the pressure and temperature of the fluid portion and gas that occupy the vessel; and calculating the volume of the fluid portion and gas in the vessel from the measured pressures and temperatures. In addition, the fluid introduction step could include introducing a fluid which is non-reactive and non-condensable at the vessel temperature into a reservoir; and measuring the volume of the fluid in the reservoir. In this regard, it is useful to temporarily halt change in the quantity of the inventory in the vessel as the measuring fluid is introduced into the vessel. Thereafter, the measuring fluid can be released from the vessel and normal inventory flow through the vessel can be resumed.

BRIEF DESCRIPTION OF THE DRAWINGS

A better understanding of the invention can be obtained by reviewing the following description which describes preferred embodiments and wherein.

DETAILED DESCRIPTION OF THE INVENTION

Figure 1:
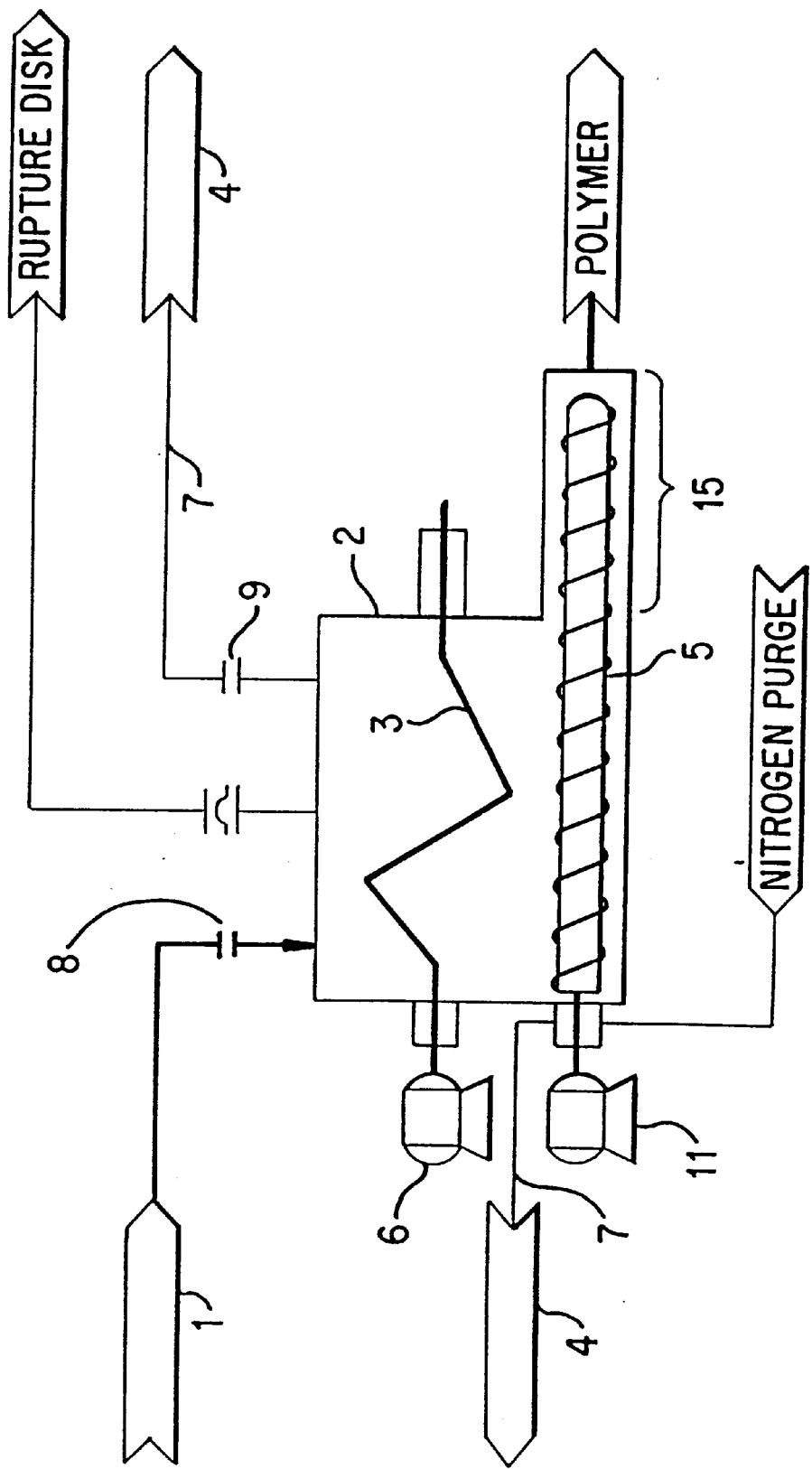
FIG. 1 illustrates a kneader-extruder apparatus in accordance with the present invention.

As noted above, the apparatus and method of this invention are useful for processing and recovering high molecular weight amorphous poly alphaolefins such as polypropylene. The terminology "high molecular weight" as used herein refers to polymers having a melt viscosity at 190° C. greater than 200,000 cps or a melt flow rate (MFR) at 230° C. less than 80 g/10 minutes. These polymers include a diethyl ether soluble fraction that exhibits no isotactic crystallinity and have an inherent viscosity of less than about 1 dl/g. These polyolefins are made by polymerizing the appropriate monomer(s) in a reactor. For example, to produce polypropylene, a liquid volume of propylene may be maintained at its bubble point pressure at approximately 135° F. to 140° F. and approximately 345 psig. Co-monomers, such as ethylene or butene-1 may be added to further enhance the polyolefin properties. The reactor is pressurized to from about 280 to 700 psig, more preferably from about 300 to 550 psig, and most preferably from about 340 to 385 psig, and cooled to from about 100° F. to 200° F., more preferably from about 120° F. to 170° F., to maintain the appropriate pressure and temperature necessary for the production of the desired polyolefin. The reactor works the unreacted compounds by mixing at from about 140 to 300 rpm, more preferably from about 180 to 285 rpm, and most preferably from about 225 to 275 rpm. The volume of the reactor is from about 50 to 500 gallons, more preferably from about 100 to 400 gallons, and most preferably from about 150 to 250 gallons. Depending upon the polyolefin desired, appropriate catalysts may be added to the reactor.

For example, the catalyst may include a supported component of an active transition metal compound, such as titanium tetrahalide mixed with an enhanced support which includes magnesium halide, more preferably magnesium chloride, and aluminum trihalide in a molar ratio of from about 8:0.5 to 8:3, more preferably from about 8:1 to 8:1.5. The molar ratio of magnesium halide to titanium tetrahalide is from about 8:0.1 to 8:1, more preferably from about 8:0.4 to 8:0.6. The catalyst would also include an organoaluminum component, typically a trialkylaluminum wherein each alkyl group contains from 1 to 9 carbon atoms. The ratio of aluminum to titanium components should be from about 50:1 to 600:1, more preferably from about 70:1 to 300:1, and most preferably from about 90:1 to 125:1. This is the first step of the present invention.

For example, polypropylene can be produced using 5% w/w heptane solution of triethylaluminum (TEA) with a titanium content of about 2.5% w/w pumped into a reactor as a 6% w/w mixture of petrolatum along with propylene monomer. This yields a polyolefin with a melting point of about 154.9° C., heat of fusion of 7.7 cal/gm, melt flow rate of 5.7 gm/10 min at 230° C., melt viscosity over 2,000,000 cps at 190° C. and a shear rate of 10 s$^{-1}$, catalyst efficiency of 11.8 Kg polymer/g catalyst, and 43.8% heptane soluble weight.

The feed to the kneader-extruder for this type material will be a slurry of particles of polypropylene in liquid propylene. Some liquid propylene will flash to a gas as it flows from the high pressure in the polymerization reactor into the lower pressure in the kneading chamber. The melt flow rate (ASTM D-1238, 2.16 kg, 230° C.) of the polypropylene will range from about 0.1 to 80 gm/10 min, more preferably from about 0.2 to 30 gm/10 min.

For example, the high molecular weight amorphous propylene homopolymer has elastic properties, forms a diethyl ether soluble fraction with no isotactic crystallinity and an inherent viscosity less than about 1 dl/g. The molecular weight is such that the melt viscosity is from about 200,000 cps to greater than about 2,000,000 cps at 190° C. This is accomplished by limiting the hydrogen level during the polymerization reaction to no more than 4% of the reactor pressure, more preferably by substantially precluding the introduction of hydrogen. The propylene homopolymer has a melting point of from about 120° C. to 200° C., more preferably from about 145° C. to 165° C.

As the polyolefin material is produced, it must be transferred to other equipment for further processing and recovery. According to the present invention, the polymerized polyolefin material may be transferred from the reactor to the interior of the novel kneader-extruder in a series of short bursts or in a continuous transfer of the material. The material may be fed in the form of an intermittent or a continuous polymer particle slurry in liquid monomer(s). Feeding of the material may alternatively occur in transfers of from about one-half second to ten seconds duration, more preferably about one second duration, with from about 1 to 10 transfers per minute, more preferably from about 1 to 4 transfers per minute, or it may occur continuously. The total feed rate, averaged over time, varies from about 20 to 150 pounds of polymer per hour with from about 80 to 180 pounds of unreacted compounds per hour. The phrase "unreacted compounds" is used herein to include unreacted propylene or other monomer(s), as well as other volatiles which are undesired in the final polyolefin product material. The feed rate more preferably varies from about 30 to 90 pounds of polymer and from about 90 to 150 pounds of unreacted monomer(s), such as propylene monomer, per hour. In the most preferred embodiment, the feed rate of polymer varies from about 42 to 60 pounds per hour, and from about 100 to 120 pounds of unreacted compounds per hour.

The driving force for the transfer is the pressure differential between the reactor and the kneader-extruder. A continuous transfer of material from the reactor to the kneader-extruder may be made, and although short transfers or blips of material may be transferred, provided that the overall result of the system is to permit more economical flow rather than batch wise operation. Thus, the kneader-extruder will act as a flash tank in a continuous chemical process, and the kneader-extruder will operate under pressure.

Referring now to FIG. 1, the polyolefin material feeds through a pipe 1, which is typically closely coupled to the kneader-extruder 2. The transfer into the kneader-extruder may be accomplished by a number of methods, such as a valve or a gate. In one embodiment, a so-called "blipper" valve is used to permit short transfers, or blips, of material to pass into the kneader-extruder. In another embodiment, a valve or gate is placed in a partially opened position to permit continuous transfers of material to pass into the kneader-extruder, wherein the amount of material transferring is dependent primarily upon the quantity of monomer(s) and catalysts fed to the reactor.

The interior of the kneader-extruder is heated to a temperature of from about 250° F. to 500° F. to drive off any unreacted monomer(s) remaining in the polyolefin material. In a more preferred embodiment, the kneader-extruder is heated to a temperature of from about 340° F. to 410° F., and from about 370° F. to 390° F. in a most preferred embodiment. This heat may be supplied by electric resistance heating elements embedded in the walls of the kneader-extruder, by electric inductive heating coils around the kneader-extruder, by heat transfer fluid circulation about the kneader-extruder or through hollow blades of an agitator or mixer that is used to work the polyolefin material and unreacted compounds, through a hollow conveying screw, or by any other conventional heating means. In a preferred embodiment, the heat transfer occurs by use of a heat transfer fluid circulating through a jacket around the kneader-extruder.

This kneader-extruder supplies sufficient energy in the form of heat, as described herein, and mechanical working of the polyolefin material to vaporize most unreacted propylene or other monomer(s) and permit separation of unreacted propylene, ethylene, hydrogen, and other unreacted compounds which are undesired in the final polyolefin product material.

The interior of the kneader-extruder contains two blades, one blade to a shaft. The shafts may be driven by separate variable speed motors, but are more preferably driven by one such motor 6 via a gear box that operates one shaft at about ½ to ¾ the speed of the other shaft, and more preferably at about ⅔ the speed of the other shaft. It is to be understood that these shafts could be independently driven at other speeds if separate motors are used. The kneader-extruder also includes a trough of about 1 to 7 feet in length and width, more preferably from about 1½ to 4 feet in length and width, and most preferably from about 20 to 24 inches in length and 22 to 30 inches in width, which provides for the exit of conditioned polyolefin from the device. In a preferred embodiment, the two blades and shafts rotate in opposite directions and downward toward the centerline of the device, thereby forcing polymer forward and downward and backward and downward to a transport extruder screw located at the bottom of the kneading chamber within the trough.

The blades work substantially all of the polyolefin material that is introduced into the kneader by rotating the faster blade at a speed from about 10 rpm to 60 rpm, more preferably from about 15 to 50 rpm, most preferably from about 25 to 40 rpm. The slower blade rotates at a speed depending on the ratio selected in the gear box of from about 5 to about 45 rpm, more preferably from about 7 to 38 rpm, most preferably from about 12 to 30 rpm. In a preferred embodiment, as shown in FIG. 1, the blades 3 are shaped like the capital Greek letter sigma ($\Sigma$). The blades are from about 1 to 5 feet in length and from about 4 to 20 inches in diameter, more preferably from about 1½ feet to 2½ feet in length and from about 7 to 16 inches in diameter, and most preferably from about 1¾ feet to 2¼ feet in length and from about 10 to 12 inches in diameter. The blades are capable of approaching substantially the entire interior surface of the kneader-extruder vessel to work the product material, in effect "scraping" substantially all the sticky polyolefin material in the kneader-extruder away from the interior surfaces and downward into the trough and transport screw 5. The scraping is necessary to prevent polyolefin material from sticking to the walls and thermally degrading by remaining in the kneader-extruder vessel 2 too long, to prevent plugging of the kneader-extruder 2, and to increase the rate of heat transfer by providing surface renewing at the heat transfer surface.

As the blades 3 work the product material, they heat the material to permit unreacted monomer(s), propylene, and other volatiles to escape. In a small scale kneader-extruder, sufficient heat is provided from the jacket, and from the recycled heated polyolefin material that is discussed in further detail below. In a larger scale kneader-extruder, the blades 3 may be hollow and contain therein a heat transfer fluid, such as hot oil or steam, or electric induction coils or other conventional heating means to provide heat to the blades and the material in the kneader-extruder. The polyolefin material is maintained in a molten state by heating and mechanical working, but not at so hot a temperature that excessive thermal degradation of the polyolefin material is induced.

Figure 2:
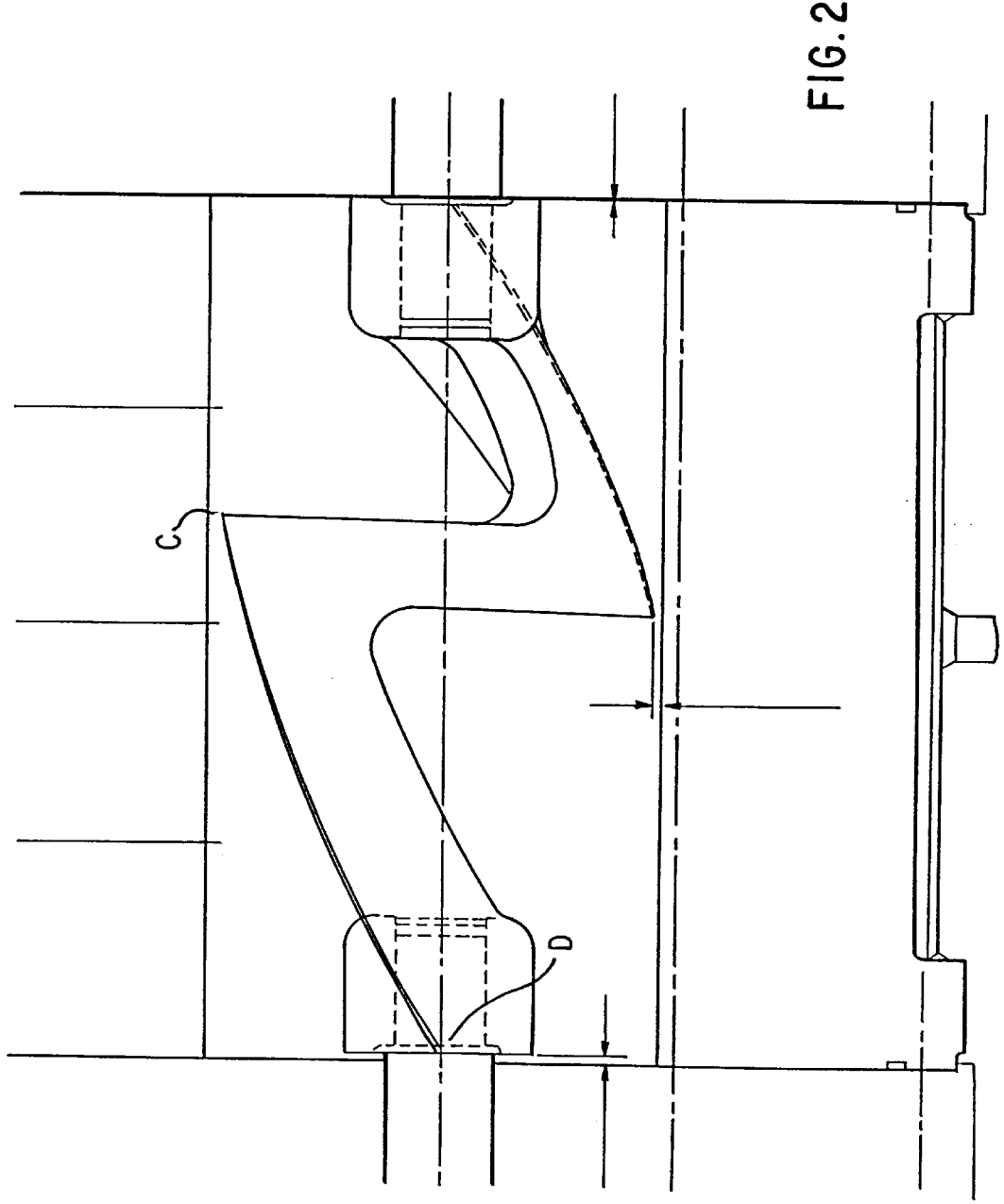
FIG. 2 illustrates a detailed depiction of the sigma-shaped blades according to the present invention.

A detailed illustration of the blades 3 is found in FIG. 2. From this figure, it is more easily seen that the outside edge of the blade does not "descend" as the drawing depicts. Rather, the outside edge of the blade is a constant distance from the shaft, which is along the longitudinal axis. Instead, the blade edge "bends" around the circumference of the trough interior. This bend, from point C to point D, takes approximately 90 degrees to be complete.

The kneader-extruder 2 has a small volume relative to the reactor used in processing the polyolefin. The amount of unreacted compounds, including monomer, in each transfer that will be vaporized determines the necessary volume of the kneader-extruder. This amount of unreacted compounds is typically from about 40% to 75%, more preferably from about 50% to 65%, and most preferably about 58%, of the material passing into the kneader-extruder 2. The free volume of the kneader-extruder 2, excluding the volume of the kneading blades and excluding the entire volume of the extruder (because the extruder screw will be filled with polymer), should be from about 20 to about 120 liters, more preferably from about 40 to 100 liters, and most preferably from about 55 to 75 liters. The amount of polymer held in the kneader-extruder chamber will be small compared to the amount in a conventional kneader mixing application. Most conventional kneaders are not closed or pressurized, and therefore are more capable of having a larger volume.

Although a variety of conventional materials may be used in constructing the kneader-extruder, it is preferred that all parts that contact the polyolefin be made of various grades of stainless steel. In a preferred embodiment, the kneader-extruder 2 has the shape of two short cylinders lying side-by-side with a small amount of overlap between them. The kneader-extruder cylinders are each from about 4 to 20 inches in diameter, more preferably from about 1½ feet to 2½ feet in length and from about 8 to 16 inches in diameter and are from about 1 to 6 feet in length, more preferably from about 2 to 4 feet in length. The diameter of each cylinder is preferably be about 0.5 inches, more preferably about 0.05 inches, and most preferably about 0.005 inches, larger than the diameter of the respective kneading blade. One kneading blade 3 is located in each cylinder of the kneader-extruder chamber. The relatively small volume of the kneader-extruder 2 and the shape of the blades 3 permits substantially all of the polyolefin product material to be mechanically worked and heated by the blades 3 to facilitate the process of removing any remaining unreacted monomer(s). In a preferred embodiment, the trough is jacketed (not shown) with a heating means such as electric induction coils, steam, or hot oil at a temperature of from about 250° F. to 500° F. to assist in vaporizing any unreacted propylene or other monomer(s) remaining. In a more preferred embodiment, the heating means is hot oil and the temperature of the hot oil is from about 385° F. to 455° F. This permits the polymer material to maintain a temperature of from about 340° F. to 410° F., more preferably from about 370° F. to 390° F.

The vent gas, which includes propylene or unreacted monomer(s) or other volatiles, is driven off from the polyolefin material by using one or more vents 4 in the kneader-extruder 2. These vents are connected to at least one knockout pot (not shown). The knockout pots are used to remove any compounds, such as catalyst, co-catalyst, and spillover polyolefin material, which are undesired in the vent gas. In a preferred embodiment, there are one or more vent lines 7 connecting the vent(s) to at least two knockout pots for removing the vent gas from the kneader-extruder. One pot is in service, while the other(s) remains as a backup. High gas velocity when new polyolefin material enters the kneader-extruder may result in carryover of that product material into the vent lines, which may induce clogging and unexpected shutdowns of the production process.

When the transfer of blips of polyolefin material occurs, brief pressure rises may be observed in the kneader-extruder due to the higher pressure of the reactor material and the flashing, or volatilization, of unreacted compounds in the material. To avoid the high gas velocity problem, the vent valve between the reactor and the kneader-extruder may be manually closed while the blipper valve 8 is open. This problem is less apparent when polyolefin material is continuously blipped into the kneader-extruder. Additionally, the vent valve 9 may be operated by a microprocessor-based timer that synchronously operates the blipper valve 8. After new polyolefin material has entered the kneader-extruder, the vent valve 9 opens slowly to permit the vent gas to begin flowing out of the kneader-extruder 2. The vent gas may additionally flow through a pressure control valve that maintains the kneader-extruder operating pressure at from about 35 to 250 psig, more preferably 50 to 150 psig, and most preferably at 60 psig. Furthermore, the vent gas may be returned to the olefin plant for processing and later reuse. The kneader-extruder operating pressure ensures flow of the vent gas through recycle pipelines (not shown) back to the olefin plant for subsequent re-introduction into the reactor.

Mechanical working by the blades 3 in the kneader-extruder 2 forces the sticky polyolefin product material into the flights of the extruder transport screw 5 on an additional rotating shaft 11 located below the blades. The average residence time of the polyolefin material in the kneader-extruder is from about 0.4 to 1.4 hours, more preferably from about 0.6 to 1 hours. The polyolefin material may then be fed through a pump and either into a heater for recycling to the kneader-extruder or directly into an extruder. The transport extruder screw 5 is preferably longer than the kneading chamber. The exit transport screw 5 is from about 1 to 8 feet long and from about 1 to 10 inches in diameter, more preferably from about 3 to 5 feet long and from about 3 to 7 inches in diameter, and most preferably about 4 feet long and about 5 inches in diameter.

This step of the method—the direct transfer of the polyolefin material in a substantially liquid or molten form via the screw from the kneader-extruder to the extruder—provides a distinct advantage over prior methods of storing the polyolefin in a wet, sticky chunk form and drying the chunks at a later date for extrusion. The use of a screw to move the polyolefin material from the kneader-extruder directly to the extruder minimizes the need for water to carry the product through the several stages of recovery processing, thereby minimizing the need for storage tanks, delivery and removal lines, valves and other equipment used to introduce, maintain, remove and recycle the water. Additionally, the present method allows for continuous processing of the polyolefin material in a substantially liquid or molten state. This avoids the intermediate step associated with existing methods of product recovery wherein the product material is stored as wet chunks and dried at a later stage for further processing. The elimination of this step also precludes the need for additional equipment required for the storage, maintenance and drying of the product material prior to further processing.

The optimum operation of the kneader-extruder requires monitoring of the amount of polyolefin in the vessel, along with the control of the residence time of the polymer therein. These can be achieved by measuring the amount of polymer in the vessel to assure that it is moving through properly. Conventional weighing technologies are not useable to measure an inventory of the polyolefin material because the kneader-extruder weighs too much (a few thousand pounds) compared to the polymer weight (a few tens of pounds) and because the kneader-extruder has far too many inflexible connections to other devices (e.g., high-pressure inlet piping, vent piping, rupture-disk piping, pressure and temperature instrumentation, rotating drive shafts, torque instrumentation, a gear box, electric motors, heat-transfer fluid inlet and outlet piping, an extruder barrel, and electrical conduits) for suspension from a weighing device. None of the conventional hydrostatic-pressure technologies are useable because the polymer is not a liquid, does not flow to the bottom of the kneading chamber, and does not exert any hydrostatic pressure on the bottom of the kneading chamber. The conventional radiation-attenuation technologies are not useable for several reasons. First, the small amount of polymer causes a small amount of attenuation of the radiation, just as with the weighing method. Second, the position and shape of the "blob" of polymer inside the kneading chamber are changing constantly, so there is no way to know where to aim the beam of radiation. Third, the mixing blades are constantly moving throughout the kneading chamber in a complicated pattern and these blades are more massive than the "blob" of polymer. Therefore, the blades will attenuate the beam of radiation more than will the polymer and the attenuation of the radiation by the moving blades will cause a complicated, rapidly-fluctuating signal as the blades move into and out of the beam of radiation. Conventional surface-detection technologies are also not useable because the shape and position of the "blob" of polymer are constantly changing. The location of the "upper surface" of the "blob" indicates nothing about the inventory of polymer. Therefore, a new technology for measuring the amount of material in a vessel was needed.

The inventory measuring method designed and developed herein uses a non-condensable gas flowing from a reservoir of known volume into the vessel of interest. The temperature and pressure of the reservoir gas and in the vessel of interest are measured before and measured or calculated after the gas is permitted to flow, thereby permitting calculation of the inventory in the vessel of interest.

Figure 3:
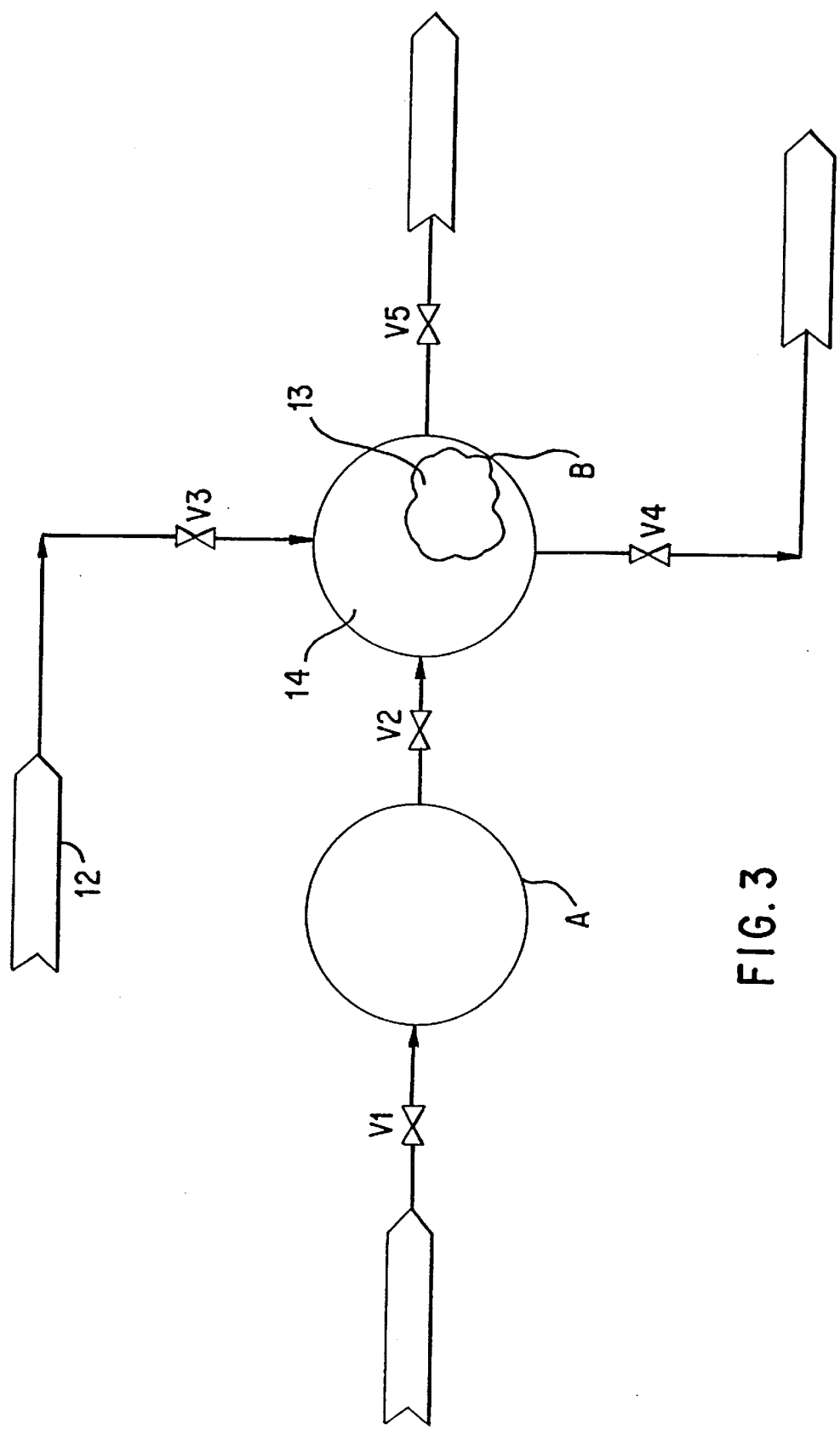
FIG. 3 illustrates an inventory measuring method associated with the product recovery method of the present invention.

Determination of the screw speed to maintain a substantially constant inventory requires the knowledge of the amount of polyolefin in the vessel, and that is determined by the novel inventory measuring method, a schematic of which is shown in FIG. 3. The substantially constant inventory is typically from about 0.2 to 1.4 ft$^3$ of inventory, more preferably from about 0.6 to 1 ft$^3$ of inventory. The polyolefin material flows into the vessel through valve V3 and out of the vessel through vent valve V4. The total volume of the vessel and all piping connected to it, up to the first block valve, is known. If there are multiple inlets 12 for polyolefin material, then there will be multiple valves V3. Similarly, if there are multiple outlets, there will be multiple vent valves V4. If these valves are not required by the processing being done in the vessel, they may be added to the design and left in the fully open position until such time as a measurement of the inventory is needed. The flows into and out of the vessel may be either continuous or intermittent. If the flows are normally continuous, it will be necessary to rearrange the process design so that the flows can be interrupted periodically for an inventory measurement. The material to be inventoried may be solid, amorphous, liquid, or any combination of these forms of matter. The material may be of any shape and consistency. The material may be located anywhere within the vessel. The material need not be all in one place, it may be in the form of several "blobs" 13.

As noted above, conventional technology cannot be used to measure the "blobs" 13 of polyolefin material. According to the present invention, it is recognized that the parts of the vessel B not occupied by the material of interest will, naturally, be filled by a gas 14 of some type at the temperature and pressure of the process. This "gas" could be a normal gas phase, a supercritical fluid, or a saturated vapor. This gas 14 might be a necessary part of the process, or the gas 14 might be irrelevant to the process, or the gas 14 might be the remaining non-condensable gas used to measure the inventory of material during the most-recent measurement cycle. The processing being done in the vessel B might or might not require a vent for the removal of gases. The present invention requires that a vent valve V5 be added, if one is not already present. For a kneader-extruder, this vent valve V5 is present and is connected to the knockout pots in a preferred embodiment.

The present inventory method is implemented by installing a reservoir A of known volume to hold a non-condensable gas at a pressure higher than the pressure of the process being performed in the vessel B of interest. The reservoir A is connected to the vessel by the valve V2. After each measurement cycle, the reservoir A is re-filled through valve V1. When used in this description, "non-condensable" means that a gas is chosen that does not condense at the temperatures and pressures encountered in the process being performed. It will be understood that generally recognized good engineering practice will be observed during the selection of a gas for a particular application without constituting an improvement to the present invention. Many factors will be considered, such as availability, cost, corrosion, flammability, safety, compatibility with the process, and the like.

In the normal operating mode, the system is arranged as follows: valve V1 is closed after the reservoir is filled with a non-condensable gas at a pressure higher than the pressure in the vessel B; valve V2 is closed; valves V3 and V4 are open. It is irrelevant that there may be other control valves regulating the flow of material into and out of the vessel and that there may be various emergency shut down valves, dump valves, quench valves, pressure relief valves, and the like. The vent valve V5 may be either open or closed, depending on the process being performed.

The inventory of material 14 in the vessel B is measured by performing a series of steps. These steps are repeated as often as necessary to obtain new measurements. The frequency of the measurements will be determined by the nature of the process being performed. In the present application, the inventory is measured every 1 to 10 minutes, more preferably every 2–5 minutes. If the inventory 14 of material changes rapidly, measurements might be performed every few seconds. If the inventory 14 changes slowly, there might be several hours between measurements. A measurement cycle includes the following steps, performed in the order listed.

1. The inlet valve V3, the outlet valve V4, and the vent valve V5 are closed.
2. The initial temperatures and pressures of the gas in the reservoir A and in the vessel B are measured.
3. The valve V2 is opened, allowing gas to flow from the reservoir A into the vessel B. The amount of gas that flows is not critical. The only requirement is that the pressures in the reservoir A and in the vessel B change enough to be measured with precision. The larger the change in pressures, the greater will be the precision of the measurement. Although a pressure change of approximately 1 psi may be used, it is more preferable to use a pressure change of at least about 5 psi, and most preferable to use a pressure change of at least 60 psi. Valve V2 may either be closed after a sufficient change in pressures, or it may be left open until the pressures in the reservoir A and in the vessel B are equal and then be closed.
4. The final temperatures and pressures of the gas in the reservoir A and in the vessel B are measured or calculated.
5. The vent valve V5 is opened, allowing the measurement gas to leave the vessel B. Then V5 is placed in whatever position is appropriate for normal operating mode.
6. Inlet valves V3 and outlet valves V4 are opened and the normal operating mode of the process resumes.
7. Refill valve V1 is opened and reservoir A is refilled to the desired pressure.
8. Refill valve V1 is closed, and the system has been returned to the initial state in preparation for another measurement cycle.
9. The amount of material in the vessel B is calculated using the measured temperatures and pressures, the total volumes of the reservoir A and the vessel B, and a thermodynamic relationship capable of describing the behavior of the chosen gas.

This method requires the repetitive opening and closing of valves, the repetitive measuring and recording of temperatures and pressures, and the repetitive calculation of a thermodynamic relationship. All of these actions can be performed manually. However, in a convenient embodiment of this method, these repetitive actions may be automated by any one of several appropriate technologies, such as a programmable logic controller, a distributed control system, a supervisory control computer, and the like. It will be understood that this automation can be implemented in an almost unlimited number of ways while adopting and not departing from the teachings of the present invention.

The thermodynamic relationship chosen will depend on a balance between the complexity of the calculations that must be performed and the accuracy of the calculated result. There are many thermodynamic relationships for describing the behavior of gasses. Any thermodynamics textbook will present several such relationships. The simpler relationships, such as the Ideal Gas Law, offer ease of calculation but may sacrifice accuracy. The more complex relationships offer increased accuracy, at the expense of more calculations. Therefore, the choice of a thermodynamic relationship will depend on an application-specific value judgement, made by the design engineer, balancing the desired accuracy against the complexity of the calculations that must be performed. It will be understood that any applicable thermodynamic relationship can be chosen without departing from the method taught by the present invention.

The accuracy of the calculated inventory may be improved by ad hoc calculations in addition to the thermodynamic relationship. For example, if there is a flow of gas into the vessel B, in addition to the gas allowed to flow from the reservoir A, due to the purging of instruments or shaft seals, this flow of purge gas can be measured, calculated, or estimated by an independent system and then this amount of purge gas can be accounted for in the inventory calculations. It will be understood that these possible application-specific additions to the calculations will be obvious to those skilled in the art, are too numerous to list, and form part of the present invention.

The control and monitoring of the inventory of the kneader-extruder 2 allows the polyolefin material to be efficiently processed and recovered. The amount of material is maintained at a level where it can be properly worked by the sigma blades 3, without overfilling or underfilling the kneader-extruder 2. Generally the kneader-extruder 2 should be operated with a volume of polyolefin material of between about 10 and 60%, preferably between 20 and 50% and most preferably between about 30 to 40% of the volume of the kneader-extruder. The introduction of material into the kneader-extruder from the reactor (not shown on FIG. 1) can be controlled by the operation of the blipper valve 8 to assist in providing material to the kneader-extruder the desired amount of polyolefin levels.

The screw 5 in the trough of the kneader-extruder is driven by a variable speed motor 11, wherein the speed is determined based on the above inventory measuring method, which transports the polyolefin product material to an extruder for further processing. Control of the speed of this screw may be partially responsible for maintaining the inventory at the desired levels. The screw 11 can be operated at a speed of between about 20 and 60 rpm, more preferably between about 30 and 45 rpm, and most preferably between about 33 to 40 rpm to try to move the appropriate amount of material out of the kneader-extruder to maintain the desired inventory. The screw 11 is also heated, typically by hot oil in the barrel of the screw, to enhance transport of the polyolefin material to the extruder. Again, other heating methods disclosed above may be substituted.

The extruder here has a short barrel 15 of about 1 to 3 feet, most preferably 2 feet, in length so that the exit transport extruder screw 5 develops enough pressure to force the viscous polyolefin material into the next piece of equipment. The barrel of the extruder 15 is that portion of the exit transport screw that does not overlap with the trough beneath the sigma blades.

As the screw 5 transports polyolefin product material out of the kneader-extruder 2, the pump 26 positioned at the end of the screw forces adequate flow of the polyolefin material through the heater 27 or into the extruder system, as the kneader-extruder screw alone typically does not supply enough pressure to do so. This circulation pump 26 operates at a rate of from about 25 to 250 lb/hr, and more preferably operates at a rate of from about 150 to 200 lb/hr.

Some of the molten polyolefin material is pumped from the kneader-extruder screw 5 through the pump 26 and into the heater 27 that furnishes additional heat energy to the polyolefin material, which material is then returned to the kneader-extruder 2. This heated polyolefin material assists in keeping the polyolefin material in the kneader-extruder 2 in a molten state, thereby assisting in the prevention of clogging and plugging. The polyolefin material is heated to a temperature of from about 300° F. to 550° F. In a preferred embodiment, the polyolefin material is heated to a temperature of from about 380° F. to 470° F. The heat source is typically steam up to approximately 650 psig, which is controlled at approximately 550 psig, although other heat sources such as hot oil may be substituted. The remainder of the polyolefin material is pumped through a control valve 28 directly to the extruder. This manual throttle, or level control valve, may be pinched to cause more polyolefin material to recycle through the heater to more completely the kneader-extruder 2. The control valve is typically used to manually adjust the kneader-extruder level based on the kneader-extruder inventory determined from the inventory measuring method, but the control valve may alternatively be configured for automatic adjustment. This control valve permits the dampening of variable flow rates from the polymerization reactor through the kneader-extruder apparatus, thereby maintaining a substantially constant polymer level in the kneader-extruder and providing a substantially uniform flow into the extruder. The inventory is maintained at a desired level by controlling the speed of at least one of the exit transport screw 5, the circulation pump 26, or the control valve 28. In a preferred embodiment, the control valve is primarily responsible for maintaining inventory at a desired level.

In the extruder, the polyolefin material is mixed with small, measured amounts of water to deactivate any remaining catalyst in the material. Antioxidants may also be added to assist in preventing degradation of the polyolefin material. Further heating of the polyolefin material may be used to further drive off any unreacted monomer(s), antioxidant solvents and excess water added during this stage. The temperature at the inlet of the extruder may be from about 250° F. to 500° F., but is more preferably from about 340° F. to 410° F. and most preferably from about 370° F. to 390° F. The exit temperature of the extruder is from about 300° F. to 550° F., but is more preferably from about 380° F. to 470° F. The heating may be accomplished by heating means disclosed above, such as electric coils, steam, hot oil or other hot materials, which are placed in the barrel, or jacket, of the extruder screw. In a preferred embodiment, either steam or hot oil is used.

The extruder is typically a conventional twin screw extruder driven by a variable speed motor 49, although other types of extruders may be substituted. The screw and the screw barrel 51 include a number of modular sections. Some of the unreacted compound vapors may flow backward and leave from a vent dome 70 to be returned to the olefin plant. This vent dome may include a pressure control valve to maintain a pressure of about 1 to 12 psig, and preferably 5 psig. Water for catalyst deactivation may be added by a water metering pump. Any excess water vapor is emitted through a vent dome 70 and routed to a vacuum pump. Antioxidant may be added to the metering pump, while volatiles and any antioxidant solvent may be emitted through a vent dome followed by routing through a vacuum pump and to an incinerator.

Finally, the polyolefin material may be transferred to a pelletizer 80 for pelletization for storage and/or use. The pelletizer may be a conventional underwater pelletizer including a die plate and a set of blades driven by a variable speed motor 90. Heat is provided to the die plate by heating means disclosed above, such as by hot oil, to maintain the product material at an extrusion temperature. As the product material emerges from the die holes, it is cut into pellets sized according to the speed of the rotating blades and is cooled by circulating water. The product material rapidly solidifies upon contact with the water.

The pellets are transported by water to a dryer 100 that separates the pellets and the water. Dry pellets are discharged through the pellet outlet nozzle into a storage means, such as a 1000 lb capacity box. The pellet water may flow by gravity from the pellet dryer to a pellet water tank. In the water tank, the water has any particles removed, such as by filtering, and is pumped back to the pelletizer. Any lost water may be replaced by addition of condensate or other water through means of a valve, such as a level control valve.

Figure 4:
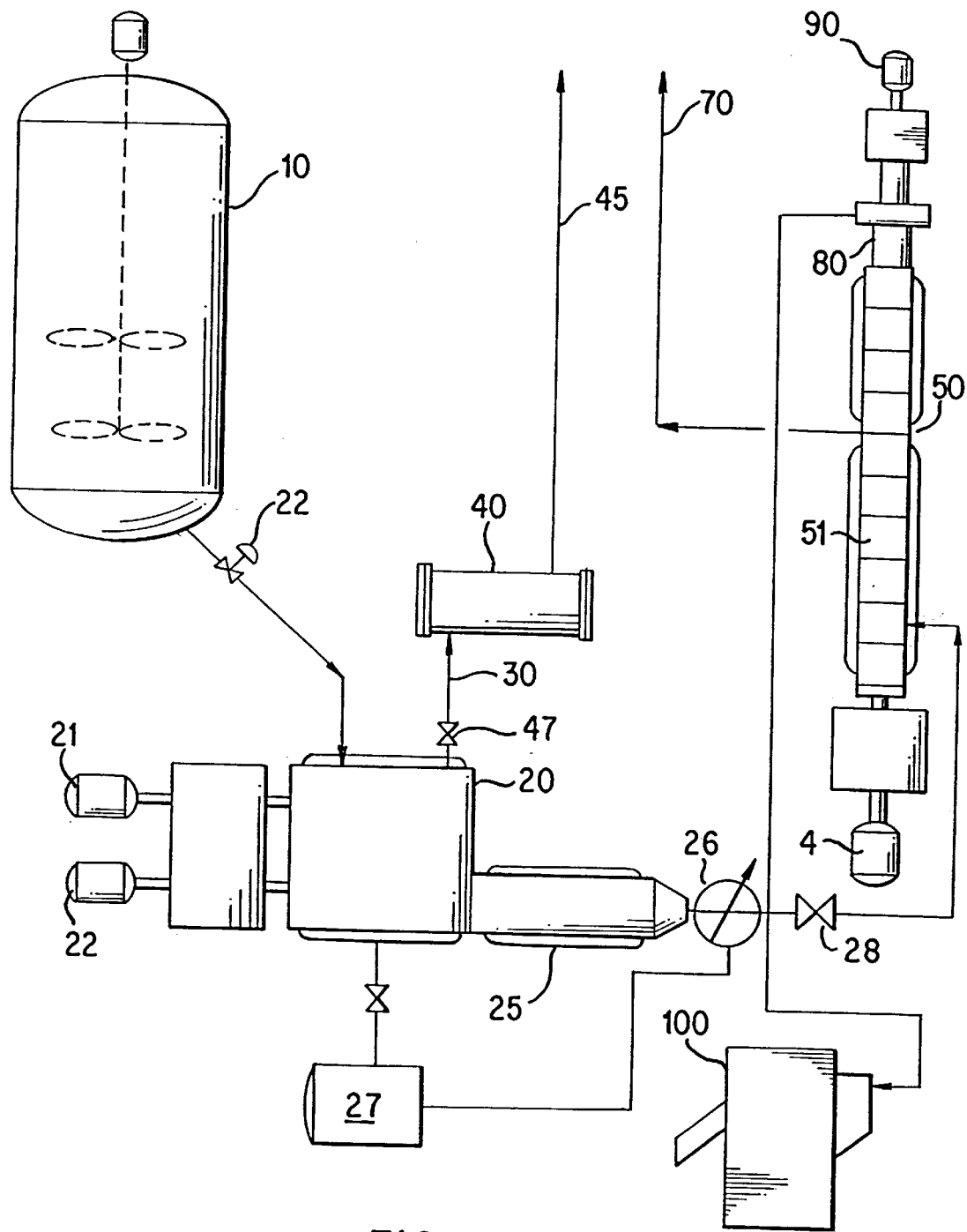
FIG. 4 illustrates an apparatus associated with the product recovery method of the present invention.

FIG. 4 shows the entire system associated with the product recovery-extruder and method of the present invention. The monomer(s) to be reacted are continuously fed into a reactor 10. The monomer(s) used will naturally depend upon the polyolefin to be produced. The reactor 10 is cooled and pressurized to maintain the desired temperature and pressure for the reaction to occur. The resulting polymer is continuously transferred to a kneader-extruder 20 via a transferring method 22. This transferring method 22 is preferably a valve. In a most preferred embodiment, a blipper valve is used. The transferring method 22 allows for convenient control of the rate at which the product material is released from the reactor 10 to the kneader-extruder 20.

In the kneader-extruder 20, the polyolefin product material is heated to a temperature as described above, depending upon the polyolefin to be produced. This increase in temperature drives off unreacted compounds contained within the product material. These unreacted compounds may include propylene, ethylene, hydrogen or other monomers.

Two blades on independent shafts within the kneader-extruder 20 are rotated by at least one variable speed motor 21 to mechanically work the product material to facilitate the removal of the unreacted compounds from the product material. This process produces gases, which may be vented through a vent valve 47 through a vent line 30 in the walls of the kneader-extruder 20. In a preferred embodiment, the venting occurs via a vent line 30 to a knockout pot 40. From the knockout pot 40, the vented gases may be purified and returned to the polyolefin plant for reuse via return line 45. To prevent carryover of the polyolefin product material into the vent 30 when operated with semi-continuous blip transfers, a vent valve 47 closes during each blip of material from the reactor 10 to the kneader-extruder 20. With the vent valve 47 closed, the vented gases within the relatively small volume kneader, which may move at high velocities, do not drive the polyolefin product material into the vent line 30. The vent valve 47 is operated by a microprocessor-based timer (not shown) which controls and coordinates both the transferring means 22 and vent valve 47.

Polyolefin product material is delivered from the blades to a variable speed screw, which is on a shaft driven by a variable speed motor 22. The screw fights transfer the product material from the kneader-extruder 20 to an extruder 50. The barrel of the screw is heated by heating means 25 to maintain the product material at a temperature substantially consistent with the temperature in the kneader-extruder 20. The heating means 25 may include electric coils, steam jacket heating, or oil jacket heating, for example.

As the polyolefin material leaves the exit transport screw and extruder barrel, it enters a pump 26 which enhances the pressure, thereby forcing the polyolefin material forward. Some of the polyolefin material flows to a heater 27, which adds heat by any of the methods disclosed above and returns the material to the kneader-extruder 20. The remainder of the material flows from the pump 26 through the control valve 28 directly to the extruder 50. The screw speed, the circulation pump 26, or the control valve 28 may be adjusted so as to maintain a substantially constant inventory of product material in the kneader-extruder 20.

In the extruder 50, the polyolefin product material is mixed with water to deactivate the catalysts. The polyolefin product material may additionally be mixed with additives to achieve the desired polyolefin material. The water is added via a metered water pump (not shown) to deactivate the catalyst(s) added to the reactor 10. This measured quantity of water facilitates formation of the desired polyolefin. Importantly, this is the only place that water is used in the product recovery apparatus and method of the present invention. Additional heating may facilitate removal of any excess water and further removes any remaining unreacted monomer(s) or other volatiles from the product material. Any gases produced within the extruder 50 are vented via a vent line 70 from the extruder 50.

From the extruder 50, the product material is transferred to a pelletizer 80. The pelletizer 80 includes a die plate and a set of rotating blades (not shown) driven by a variable speed motor 90. Heat is provided to the die plate to maintain the product material at an extrusion temperature. As the product material emerges from the die holes, it is cut into pellets sized according to the speed of the rotating blades and is cooled by circulating water. The product material rapidly solidifies upon contact with the water.

The pellets are carried by flowing water to a dryer 100, where the pellets are recovered from the water and dried with air. The pellets are then packaged and stored for later use.

Figure 5:
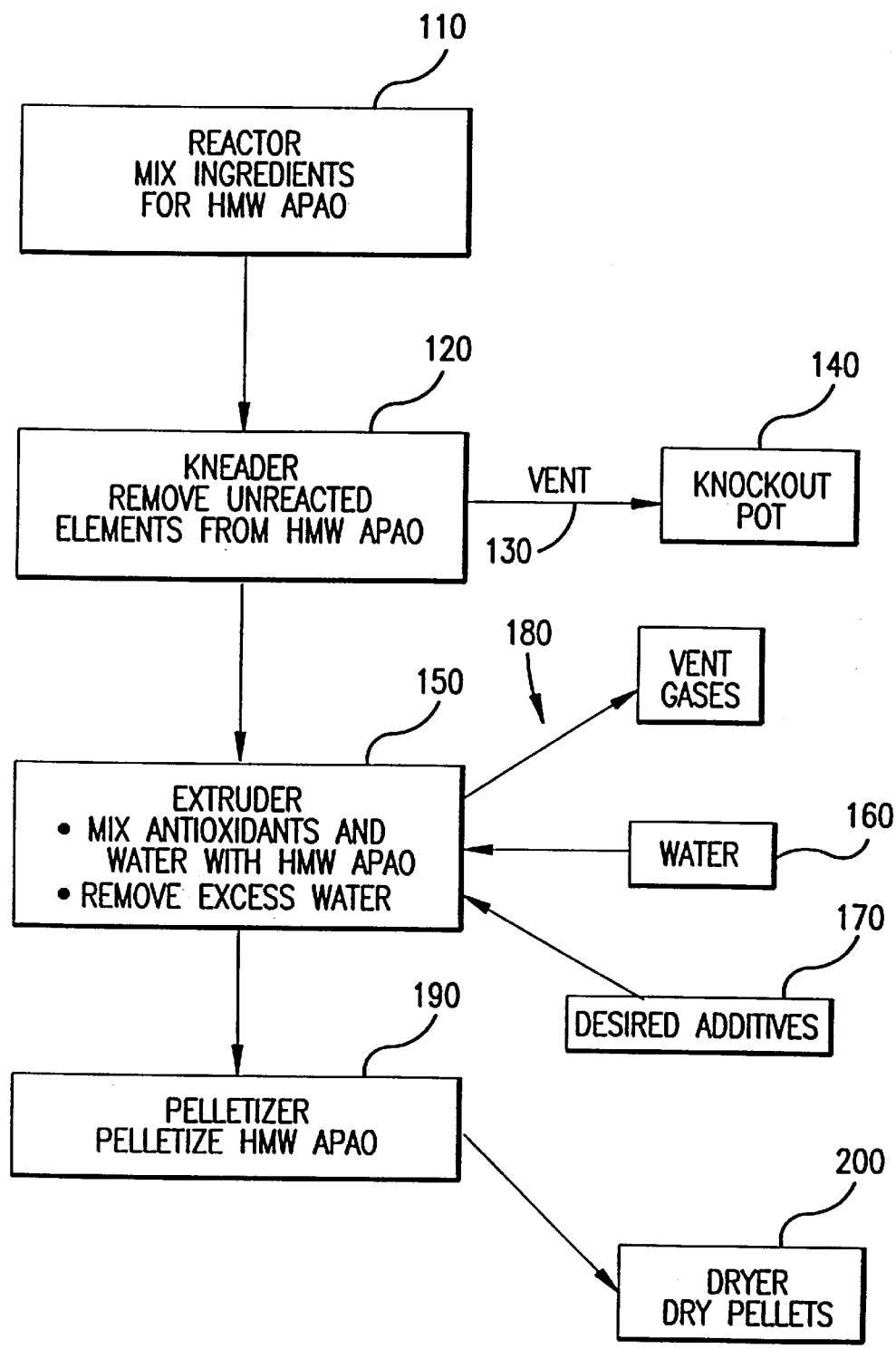
FIG. 5 is a flow diagram illustrating the steps associated with the product recovery method of the present invention.

FIG. 5 is a flow diagram illustrating the steps associated with the product recovery method of the present invention. The monomer(s) necessary to produce the desired polyolefin are continuously fed into a reactor during step 110. The reactor is cooled and pressurized to facilitate production of the polyolefin material. Polyolefin product material is then transferred to a kneader-extruder 120, where any remaining unreacted monomer(s) and volatile(s) are removed. The monomer(s) and volatile(s) are driven off by heating the polyolefin material in the kneader-extruder to from about 250° F. to 500° F. Mechanical working of the polyolefin material by two or more blades in this step enhances the removal of unreacted compounds. Gases produced during this step of the process are vented through a vent means such as a knockout pot, and are then purified for reuse 130 and 140.

In step 150, the polyolefin product material is transferred to an extruder where water and desired additives such as antioxidants may be mixed with the polyolefin material 160 and 170. The addition of measured amounts of water deactivates the catalysts in the polyolefin product material. Gases produced during this step of the product recovery method are also vented 180.

Next, the polyolefin material, or product material, is transferred from the extruder to a pelletizer. In the pelletizer, the polyolefin material is cut via rotating blades into pellets and is cooled by circulating water 190. The pellets are transferred by the flowing water to a dryer. The pellets are removed from the water and dried prior to being packaged or used 200. The drying is preferably accomplished with air.

The kneader-extruder is novel in its ability to handle and transport several different families of polymers in the same plant, rather than needing a different plant for each polymer as would be required if using existing transport technologies. A single plant, using the kneader-extruder technology and inter-related inventory measuring methods disclosed herein, can produce several different families of polymers. Thus, a manufacturer gains the significant economic advantage of having a multi-product plant with a variable product mix, which can be adjusted at any time to take best advantage of the prevailing markets for the various raw materials and products.

EXAMPLES

Example 1

Method for Measuring Inventory in Vessels

The following nomenclature is defined to make the notation of the equations more convenient. Values pertaining to the reservoir are denoted by the subscript "A", and values pertaining to the vessel are denoted by the subscript "B." The initial measurements made before the gas is allowed to flow from the reservoir into the vessel are denoted by the subscript "i", and the final measurements are denoted by the subscript "f." Temperature values are denoted by the symbol "T", and pressure values are denoted by the symbol "P." The number of moles of a gas is denoted by the symbol "n" and the universal gas constant by the symbol "R." Volume is denoted by the symbol "V." The definition of "volume" includes not only the space inside the reservoir and the vessel, but includes also the space inside all attached piping, instruments, and fittings, up to the first closed valve. The total volume of the vessel, when it is empty, is denoted by the subscript "t." The volume in the vessel occupied by the gas phase is denoted by the subscript "B." This is the volume that is measured by the method of the present invention. The volume of material in the vessel is then calculated as the difference between the total volume of the vessel when empty and the volume of the gas phase in the vessel. This desired result, the volume of material in the vessel, is denoted by the subscript "m." Thus, we have the following nomenclature:

$T_{Ai}$—initial reservoir temperature
$T_{Af}$—final reservoir temperature
$T_{Bi}$—initial vessel temperature
$T_{Bf}$—final vessel temperature
$P_{Ai}$—initial reservoir pressure
$P_{Af}$—final reservoir pressure
$P_{Bi}$—initial vessel pressure
$P_{Bf}$—final vessel pressure
$n_{Ai}$—initial moles of gas in reservoir
$n_{Af}$—final moles of gas in reservoir
$n_{Bi}$—initial moles of gas in vessel
$n_{Bf}$—final moles of gas in vessel
R—universal gas constant
$V_A$—reservoir volume, a known constant
$V_t$—empty vessel volume, a known constant
$V_B$—gas phase volume in the vessel
$V_m$—volume of material in the vessel
$Z_{Ai}$—initial compressibility of gas in reservoir
$Z_{Af}$—final compressibility of gas in reservoir
$Z_{Bi}$—initial compressibility of gas in vessel
$Z_{Bf}$—final compressibility of gas in vessel The steps described above in the section "Detailed Description of the Invention" are executed, in the order described. During step 2, the initial temperatures and pressures are measured. The initial moles of gas in the reservoir and in the gas phase in the vessel can be calculated from the Ideal Gas Law as in Equations (1) & (2) below. However, it is to be understood that any other applicable thermodynamic relationship could be substituted. A more complex relationship might be preferred for increased accuracy. The Ideal Gas Law is used in this example to illustrate the theory behind the present invention.

$$n_{Ai} = \frac{P_{Ai} * V_A}{Z_{Ai} * R * T_{Ai}} \tag{1}$$

$$n_{Bi} = \frac{P_{Bi} * V_B}{Z_{Bi} * R * T_{Bi}} \tag{2}$$

The compressibility factors are conventional values that are found in various textbooks and handbooks on the chemical properties of gases. They may also be calculated based on the known pressure, temperature, and composition of the gas. The final temperatures may be measured or they may be estimated based on a formula derived from experimental data.

As described in step 3, valve V2 is opened and gas is allowed to flow from the reservoir into the vessel. Then valve V2 is closed. The final temperatures and pressures are measured during step 4. Steps 5 through 8 are executed to return the system to the normal operating mode. Now, as described in step 9, the Ideal Gas Law or a suitable substitute thermodynamic relationship can be used to calculate the final moles of gas in the reservoir and in the gas phase in the vessel as in Equations (3) & (4):

$$n_{Af} = \frac{P_{Af} * V_A}{Z_{Af} * R * T_{Af}} \tag{3}$$

$$n_{Bf} = \frac{P_{Bf} * V_B}{Z_{Bf} * R * T_{Bf}} \tag{4}$$

The Law of Conservation of Mass indicates that the sum of the moles of gas in the entire system of reservoir plus vessel does not change, such that Equation (5) is obtained:

$$n_{Ai} + n_{Bi} = n_{Af} + n_{Bf} \tag{5}$$

Equations (1), (2), (3), and (4) can be substituted into Equation (5) as follows:

$$\frac{P_{Ai} * V_A}{Z_{Ai} * R * T_{Ai}} + \frac{P_{Bi} * V_B}{Z_{Bi} * R * T_{Bi}} = \frac{P_{Af} * V_A}{Z_{Af} * R * T_{Af}} + \frac{P_{Bf} * V_B}{Z_{Bf} * R * T_{Bf}} \tag{6}$$

Equation (6) can be rearranged algebraically to give:

$$V_B = V_A * \frac{\frac{P_{Af}}{Z_{Af} * T_{Af}} - \frac{P_{Ai}}{Z_{Ai} * T_{Ai}}}{\frac{P_{Bi}}{Z_{Bi} * T_{Bi}} - \frac{P_{Bf}}{Z_{Bf} * T_{Bf}}} \tag{7}$$

All the terms in Equation (7), except $V_B$ are known, thereby permitting calculation of $V_B$. The volume of material in the vessel is the difference between the total volume of the vessel and the volume of the gas phase in the vessel, as in Equation (8):

$$V_m = V_t - V_B \tag{8}$$

All the terms in Equation (8), except $V_m$ are known, thereby permitting calculation of $V_m$. This is the desired result.

In one experiment, $P_{Ai}$ was 192.8 psia, $V_A$ was 0.524 ft$^3$, R was 10.73 psi*ft$^3$/lb*mol*°F, $T_{Ai}$ was 581.8°R, and $Z_{Ai}$ was 0.80047, yielding an initial number of moles in the reservoir of 0.020222 moles. Measurements indicated that $P_{Af}$ was 139.324 psia, $T_{Af}$ was 561.9°R, and $Z_{Af}$ was 0.84076, yielding a final number of moles in the reservoir of 0.014403 moles. In the vessel whose contents were being measured, $P_{Bi}$ was 69.6299 psia, $V_B$ was unknown, $T_{Bi}$ was 560.0°R, and $Z_{Bi}$ was 0.93019, yielding an initial number of moles in the vessel of 0.026295 moles. Measurements after the pressure change indicated that $P_{Bf}$ was 84.841 psia, $V_B$ was unknown, $T_{Bf}$ was 564.8°R, and $Z_{Bf}$ was 0.91999, yielding a final number of moles in the vessel of 0.032115 moles. Using these numbers in the above equations results in a final $V_m$, or volume of inventory in the vessel, of 0.178306 ft$^3$.

Example 2

Measuring Inventory of a Kneader Extruder

The use of an application-specific addition to the thermodynamic relationship will be illustrated by Example 2, in which a pressure transmitter, connected to the vessel, is purged by a continuous flow of an inert gas. The purpose of this example is to show that application-specific modifications can be added to the thermodynamic relationship to improve the accuracy of the calculated result without departing from the intent of the present invention.

Again, reference is made to FIG. 1 and to the nomenclature defined in Example 1. The flow rate of the purge gas is measured by any appropriate flow-measuring technology. The molar flow rate of the purge gas will be denoted by the symbol "F." The amount of purge gas that flows into the system before the initial measurements are taken is irrelevant because it is accounted for in the initial measurements. The purge gas that flows into the system must be accounted for during the time between the taking of the initial and final measurements. The elapsed time between the taking of the initial and final measurements is denoted by the symbol "t" and the moles of purge gas that flow into the system during this elapsed time is denoted by the symbol $n_p$.

The amount of purge gas that flows into the system during the time between measurements can be calculated as the product of the flow rate of purge gas and the elapsed time. The flow rate of purge gas and the elapsed time are measured values, therefore, $n_p$ can be calculated as in Equation (9):

$$n_p = F*t \qquad (9)$$

The mass balance described in Example 2 by Equation (5) must be modified to account for the amount of purge gas that flows into the system between measurements. The final sum of moles of gas in the system is no longer equal to the initial sum of moles of gas in the system, but is instead equal to the initial sum of moles of gas in the system plus the amount of purge gas that flowed into the system between measurements. Thus, for Example 3, equation (5) should be written as Equation (10):

$$n_{Ai} + n_{Bi} + n_p = n_{Af} + n_{Bf} \qquad (10)$$

Again, as in Example 1, equations (1), (2), (3), and (4) can be substituted into Equation (10).

$$\frac{P_{Ai}*V_A}{R*T_{Ai}} + \frac{P_{Bi}*V_B}{R*T_{Bi}} + n_p = \frac{P_{Af}*V_A}{R*T_{Af}} + \frac{P_{Bf}*V_B}{R*T_{Bf}} \qquad (11)$$

Equation (11) can be rearranged algebraically to give:

$$V_B = \frac{V_A * \left[\frac{P_{Af}}{T_{Af}} - \frac{P_{Ai}}{T_{Ai}}\right] - n_p * R}{\frac{P_{Bi}}{T_{Bi}} - \frac{P_{Bf}}{T_{Bf}}} \qquad (12)$$

All the terms in equation (12), except $V_B$, are known, therefore, $V_B$ can be calculated. The volume of material in the vessel is the difference between the total volume of the vessel and the volume of the gas phase in the vessel, as in Equation (13):

$$V_m = V_t - V_B \qquad (13)$$

All the terms in equation (13), except $V_m$ are known, therefore, $V_m$ can be calculated. This is the desired result.

Although preferred embodiments of the invention have been illustrated in the accompanying drawings and described in the foregoing Detailed Description of the Preferred Embodiments, it will be understood that the invention is not limited to the embodiments disclosed, but is capable of numerous rearrangements and modifications of parts and elements without departing from the spirit of the invention. It will be further understood that all design codes and standards and generally recognized good engineering practice will be observed in the process design and mechanical design of any embodiment of the present invention and, furthermore, it will be understood that the mechanical details of every design may be slightly different or modified by one of ordinary skill in the art without departing from the methods and apparatus disclosed and taught by the present invention.

What is claimed is:

1. An apparatus for the recovery of a high molecular weight amorphous polyolefin comprising;
    means for receiving high molecular weight amorphous polyolefin material;
    means for continuously transferring high molecular weight amorphous polyolefin material along with residual catalyst and unreacted monomer(s) as a mixture into the receiving means;
    means for determining the volume of the mixture to assist in maintaining a desired inventory in the receiving means;
    means for venting unreacted monomer(s) from the receiving means;
    means for heating the mixture in the receiving means to a temperature of at least about 250° F.;
    means for kneading the mixture in the receiving means for a time sufficient to form a conditioned high molecular weight amorphous polyolefin and to remove unreacted monomer(s) from the mixture; and
    means for removing the conditioned polyolefin from the receiving means for recovery of same;
    wherein the receiving means is pressurized to about 35 to 250 psig.

2. The apparatus of claim 1, further comprising means for controlling the material transfer means and the venting means to substantially avoid carryover of polyolefin material into the venting means.

3. The apparatus of claim 1, further comprising means for controlling at least one of the material transfer or conditioned polyolefin removal steps to maintain a sufficient volume of mixture in the receiving means to provide a residence time for the polyolefin which is sufficient to enable removal of a substantial portion of the unreacted monomers while avoiding overheating of the polyolefin.

4. The apparatus of claim 1, wherein the means for continuously transferring polyolefin material includes a blipper valve so that the material can be transferred intermittently.

5. The apparatus of claim 1, wherein the means for venting unreacted monomer comprises at least one vent line and at least one knockout pot associated with the vent line.

6. The apparatus of claim 1, wherein the means for removing the conditioned polyolefin includes an exit transport screw.

7. The apparatus of claim 1, wherein the means for heating the mixture comprises a jacket encompassing the receiving means and a heating medium which passes between the jacket and the receiving means.

8. The apparatus of claim 1, wherein the means for kneading the mixture includes rotatable sigma blades.

9. The apparatus of claim 8, wherein the kneading means includes two sigma blades which rotate oppositely to each other to knead the mixture while forcing polyolefin between the blades toward the conditioned polyolefin recovery means.

10. The apparatus of claim 1, wherein the receiving means is operated at a pressure of from about 35 to 100 psig.

11. The apparatus of claim 1, wherein the kneading means comprises blade members which have hollow cores and the heating means comprises a heating medium disposed in the hollow cores of the blades.

12. The apparatus of claim 1, wherein the means for determining the volume of the mixture to assist in maintaining the inventory of the receiving means comprises:

means for introducing a portion of a known volume of a fluid from a reservoir into the receiving means, which fluid is non-reactive and non-condensable at the receiving means temperature, to produce a detectable pressure change in the reservoir;

means for measuring the volume of the fluid portion and gas that occupies the receiving means; and means for determining the amount of inventory in the receiving means by subtracting the measured volume from the known volume of the receiving means.

13. The apparatus of claim 12, wherein the fluid portion volume measuring means comprises:

means for determining the pressure and temperature of the gas in the receiving means before introduction of the fluid portion;

means for determining the pressure and temperature of the known fluid volume before introduction into the receiving means;

means for determining the pressure and temperature of the fluid portion which is not introduced into the receiving means;

means for measuring the pressure and temperature of the fluid portion and gas that occupy the receiving means; and means for calculating the volume of the fluid portion and gas in the receiving means from the measured pressures and temperatures.

14. The apparatus of claim 12, wherein the fluid introduction means further comprises:

means for introducing a fluid which is non-reactive and non-condensable at the receiving means temperature into a reservoir; and means for measuring the volume of the fluid in the reservoir.

15. The apparatus of claim 12, which further comprises means for temporarily halting change in the quantity of the inventory in the receiving means as the measuring fluid is introduced into the receiving means.

16. The apparatus of claim 15, which further comprises:

means for releasing the measuring fluid from the vessel; and means for resuming normal inventory flow through the vessel.

17. The apparatus of claim 1, wherein the desired inventory is a substantially constant inventory.

18. An apparatus for the recovery of a high molecular weight amorphous polyolefin comprising;

an enclosure for receiving high molecular weight amorphous polyolefin material;

a first screw feeder for continuously transferring polyolefin material along with residual catalyst and unreacted monomer(s) as a mixture into the enclosure;

a volume measuring device for determining the volume of the mixture to assist in maintaining a desired inventory in the enclosure;

an exit nozzle for venting unreacted monomer(s) from the enclosure;

a heating device for heating the mixture in the enclosure to a temperature of at least about 250° F.;

a kneading device for kneading the mixture in the enclosure for a time sufficient to form conditioned polyolefin and to remove unreacted monomer(s) from the mixture; and a second screw feeder for removing the conditioned polyolefin from the enclosure for recovery of same, wherein the enclosure is pressurized to about 35 to 250 psig.

* * * * *